(12) United States Patent
Shack et al.

(10) Patent No.: US 10,572,227 B2
(45) Date of Patent: *Feb. 25, 2020

(54) AUTOMATED INTERFACE DESIGN

(71) Applicant: Google LLC, Mountain View, CA (US)

(72) Inventors: Emily Rebecca Shack, Mountain View, CA (US); Jeffrey William Nichols, San Diego, CA (US); Daniel Aaron Afergan, Mountain View, CA (US); Christian Robertson, Pleasanton, CA (US)

(73) Assignee: Google LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/226,512

(22) Filed: Dec. 19, 2018

(65) Prior Publication Data

US 2019/0121617 A1    Apr. 25, 2019

Related U.S. Application Data

(63) Continuation of application No. 15/464,279, filed on Mar. 20, 2017, now Pat. No. 10,168,998.

(51) Int. Cl.
| | | |
|---|---|---|
| *G06F 8/20* | (2018.01) | |
| *G06F 8/10* | (2018.01) | |
| *G06F 8/38* | (2018.01) | |
| *G06F 8/35* | (2018.01) | |
| *G06F 3/0484* | (2013.01) | |

(52) U.S. Cl.
CPC .............. *G06F 8/20* (2013.01); *G06F 8/10* (2013.01); *G06F 8/35* (2013.01); *G06F 8/38* (2013.01); *G06F 3/0484* (2013.01)

(58) Field of Classification Search
None
See application file for complete search history.

(56) References Cited

U.S. PATENT DOCUMENTS

| | | |
|---|---|---|
| 5,041,992 A | 8/1991 | Cunningham |
| 7,546,577 B2 | 6/2009 | Do |

(Continued)

FOREIGN PATENT DOCUMENTS

WO    WO-01/44933 A2    6/2001

OTHER PUBLICATIONS

Shirota et al., "Automatic GUI Generation from Database Schema Information," Systems & Computers in Japan, May 1997, vol. 28, No. 5, pp. 1-10.

(Continued)

*Primary Examiner* — Philip Wang
(74) *Attorney, Agent, or Firm* — Shumaker & Sieffert, P.A.

(57) ABSTRACT

An automated interface generates a tree of design actions based on a predetermined design specification, each intermediary node of the tree representing a partial user interface design, and each branch of the tree representing a design action that creates or modifies the partial user interface design. A plurality of candidate user interface designs are determined, each implementing the received plurality of functions, by traversing the tree along multiple traversal paths from a root node of the tree to respective leaf nodes of the tree and executing respective design actions represented by branches along the traversal paths. A completed interface design is selected from the plurality of completed interface designs, and the final user interface is generated based on the selected candidate user interface design.

20 Claims, 6 Drawing Sheets

(56) References Cited

U.S. PATENT DOCUMENTS

| 8,091,036 | B1 | 1/2012 | Pavek |
| 8,121,826 | B1 | 2/2012 | Neely |
| 8,171,406 | B1 | 5/2012 | Newstadt et al. |
| 8,984,424 | B2 | 3/2015 | Relyea |
| 9,323,418 | B2 | 4/2016 | DiVita |
| 2005/0223320 | A1 | 10/2005 | Brintzenhofe et al. |

OTHER PUBLICATIONS

International Search Report and Written Opinion from PCT/US2017/055428, dated Jan. 11, 2018, 18 pages.

Gajos, "Automatically Generating Personalized User Interfaces with Supple," Department of Computer Science and Engineering, May 23, 2010, 49 pages.

Puerta, "Beyond Data Models for Automated User Interface Generation," Stanford University, retrieved Nov. 23, 2016, 14 pages.

International Preliminary Report on Patentability from International Application No. PCT/US2017/055428, dated Sep. 24, 2019, 11 pp.

AUTOMATED INTERFACE DESIGN

CROSS REFERENCE TO RELATED APPLICATIONS

This application is a continuation application of U.S. application Ser. No. 15/464,279, entitled "AUTOMATED INTERFACE DESIGN," filed on Mar. 20, 2017, the entirety of which is incorporated herein by reference.

BACKGROUND

User interface design and construction is often time consuming. Automation of user interface designs is complex, use fixed rules, and is difficult to scale without significant cost.

SUMMARY

The subject technology provides a system and computer-implemented method for automating user interface designs. In some implementations, a method comprises receiving, for a user interface to be generated, a plurality of functions and relationship information describing how the plurality of functions relate to each other, generating a tree of design actions based on the plurality of functions and relationship information, each intermediary node of the tree representing a partial user interface design, and each branch of the tree representing a design action that creates or modifies the partial user interface design, determining a plurality of candidate user interface designs, each implementing the received plurality of functions, by traversing the tree along multiple traversal paths from a root node of the tree to respective leaf nodes of the tree and executing respective design actions represented by branches along the traversal paths, selecting a selected completed interface design from the plurality of completed interface designs based on a predetermined selection algorithm, and generating the user interface based on the selected candidate user interface design.

The method may further comprise creating a respective candidate user interface design that implements the received plurality of functions by traversing the tree along a respective traversal path from the root node of the tree to a respective leaf node of the tree and executing respective design actions represented by branches along the traversal path, calculating a design score for the respective candidate user interface design based on an evaluation of the respective candidate user interface design using a predetermined evaluation algorithm, repeating the creating and calculating steps to generate the plurality of candidate user interface designs and a corresponding plurality of design scores, and selecting the selected completed interface design from the plurality of completed interface designs based on the plurality of design scores. Other aspects include corresponding systems, apparatuses, and computer program products for implementation of the computer-implemented method.

In one or more implementations, the system comprises one or more processors and a memory comprising instructions stored thereon that, when executed by the one or more processors, cause the one or more processors to perform operations. In some implementations, the operations comprise, receiving, for a user interface to be generated, a plurality of functions and relationship information describing how the plurality of functions relate to each other, generating a tree of design actions based on the plurality of functions and relationship information, each intermediary node of the tree representing a partial user interface design, and each branch of the tree representing a design action that creates or modifies the partial user interface design, determining a candidate user interface design that implements the received plurality of functions by traversing the tree along a traversal path from a root node of the tree to a leaf node of the tree and executing respective design actions represented by branches along the traversal path, calculating a design score for the candidate user interface design based on an evaluation of the candidate user interface design using a predetermined algorithm, repeating the determining and calculating to generate a plurality of candidate user interface designs and a corresponding plurality of design scores, selecting a selected completed interface design from the plurality of completed interface designs based on the plurality of design scores, and generating the user interface based on the selected candidate user interface design. Other aspects include corresponding methods, apparatuses, and computer program products for implementation of the operations.

In one or more implementations, a non-transitory computer-readable medium having instructions stored thereon that, when executed, cause a computing device to perform a method, comprising receiving, for a user interface to be generated, a plurality of functions and relationship information describing how the plurality of functions relate to each other, generating a tree of design actions based on the plurality of functions and relationship information, each intermediary node of the tree representing a partial user interface design, and each branch of the tree representing a design action that creates or modifies the partial user interface design, determining a candidate user interface design that implements the received plurality of functions by traversing the tree along a traversal path from a root node of the tree to a leaf node of the tree and executing respective design actions represented by branches along the traversal path, calculating a design score for the candidate user interface design based on an evaluation of the candidate user interface design using a predetermined algorithm, repeating, for a predetermined number of iterations, the determining and calculating steps to generate a plurality of candidate user interface designs and a corresponding plurality of design scores, selecting a selected completed interface design from the plurality of completed interface designs based on the plurality of design scores, and generating the user interface based on the selected candidate user interface design. Other aspects include corresponding methods, systems, apparatuses, and computer program products for implementation of the machine-readable medium.

It is understood that other configurations of the subject technology will become readily apparent to those skilled in the art from the following detailed description, wherein various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

BRIEF DESCRIPTION OF THE DRAWINGS

A detailed description will be made with reference to the accompanying drawings.

DETAILED DESCRIPTION

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, it will be clear and apparent to those skilled in the art that the subject technology is not limited to the specific details set forth herein and may be practiced without these specific details. In some instances, well-known structures and components are shown in block diagram form in order to avoid obscuring the concepts of the subject technology.

The subject technology provides an automated user interface design system that quickly generates a user interface based on a specification. First, a design interface captures (e.g., from the user) a design specification that includes a plurality of functions to be implemented in the user interface to be generated, and relationship information describing how the functions relate to each other. The design specification may be in the form of a hierarchy of groups, with each group comprising one or more state variables, commands, and/or textual information. The relationship information may include the hierarchy itself.

Once the design specification has been captured, the system of the subject technology generates a data structure of design actions based on the plurality of functions and relationship information included in the design specification. The data structure may be a "design tree," which includes branches and nodes, with the root node representing the design specification, and each leaf node representing a candidate user interface design. Each intermediary node of the design tree represents a partial user interface design, and each branch of the tree represents a design action that creates or modifies the partial user interface design. Each branch of a node at a given node level within the tree corresponds to a design action of the same type.

Several types of design actions may be implemented, with nodes at each node level of the design tree implementing different types of design actions. For example, each branch of a first node at a first node level may correspond to a design action that performs a different merge operation on the hierarchy of groups provided in the design specification. According to one example, a first group and a second group may be in a child-parent relationship, and the first group may be merged into the second group. Each branch of a second node at a second node level may correspond to a design action that selects a widget type for a respective function of the plurality of functions. When the branch of the second node is selected, a widget of a widget type for the branch is placed into the generated user interface.

The design tree is automatically traversed along a traversal path from the root node of the tree to a leaf node, and respective design actions represented by branches along the traversal path are executed. Which branches are selected the first time the tree is traversed may be determined randomly. A user interface design is automatically generated by the sum of all design actions selected along the traversal path.

During subsequent traversals of the design tree, a traversal algorithm may ignore nodes and branches whose children have already been fully explored. To guide future traversals of the tree, the design score assigned to a candidate user interface design may be assigned to each intermediary node in the traversal path leading up to the candidate user interface design. The design score may be aggregated with other design scores for candidate user interface designs that were generated using a traversal path that includes the intermediary node. In this regard, when the design tree is traversed, a branch may be selected from a plurality of branches based on the aggregate scores assigned to the nodes of the branches.

When the traversal algorithm reaches a leaf node a candidate user interface design has been determined. The system then calculates a design score for the candidate user interface design based on an evaluation of the candidate user interface design using one or more predetermined evaluation algorithms. Predetermined evaluation algorithms may incorporate, for example, predetermined heuristics related to user interface design quality or physiological models of human performance.

The design tree may be traversed a number of times to generate a plurality of candidate user interface designs and a corresponding plurality of design scores. One of the completed interface designs is then selected based on the plurality of design scores, and the user interface is generated based on the selected candidate user interface design.

Figure 1:
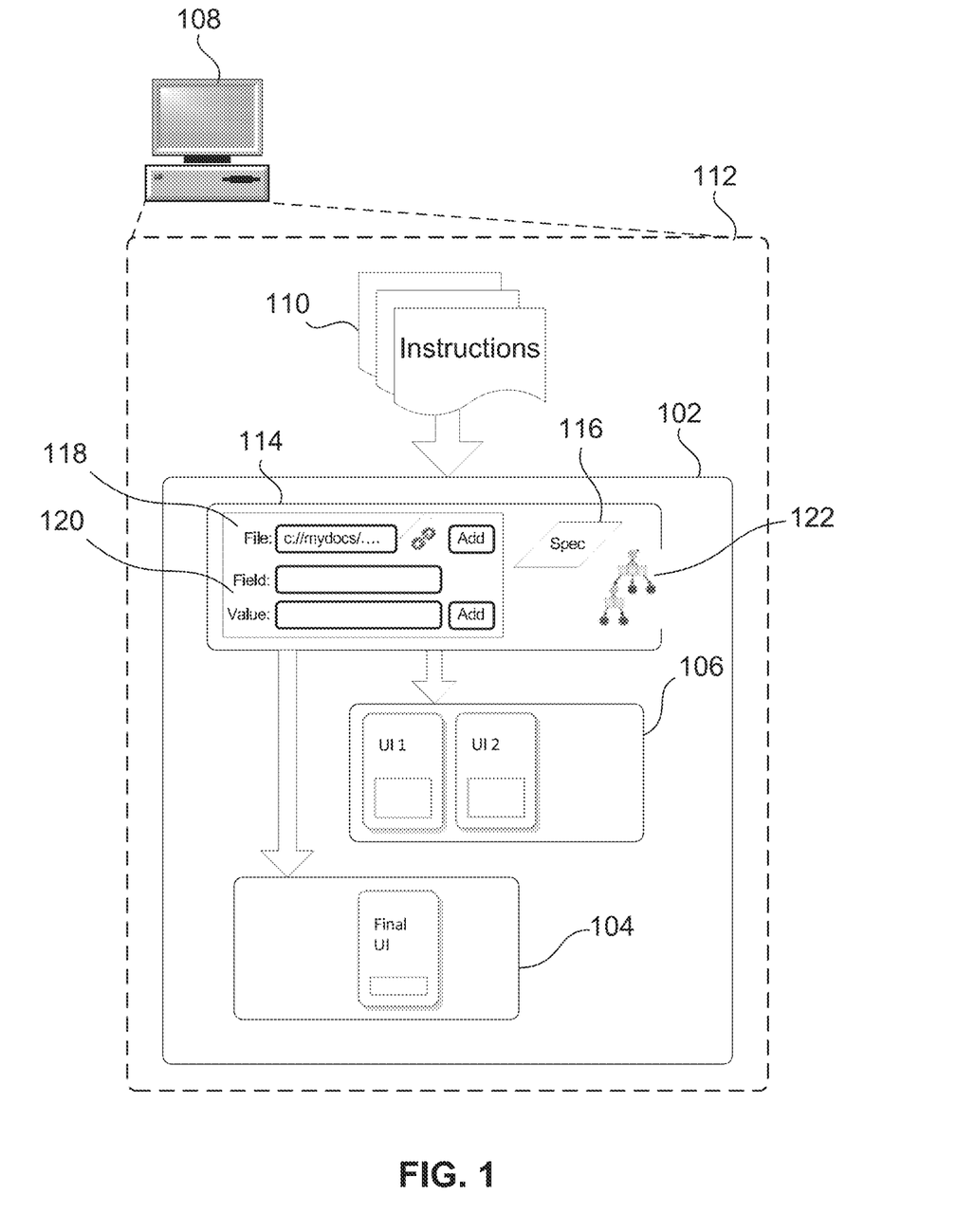
FIG. 1 depicts an example designer interface for automated generation of a final user interface based on candidate user interface designs.

FIG. 1 depicts an example designer interface 102 for automated generation of a final user interface 104 based on candidate user interface designs 106, according to one or more aspects of the subject technology. During operation of a computing device 108, executable instructions 110 are loaded into a runtime environment 112 and executed. Instructions 110, when executed, create designer interface 102, and may perform a number of operations upon data provided for display in designer interface 102.

Executable instructions 110 may implement, as part of designer interface 102, an automated design interface 114 that receives input data from a user and automatically generates final user interface 104 based on a series of algorithmic operations. According to some implementations, a design specification 116 is uploaded to design interface 102 by way of an upload interface 118. Additionally or in the alternative, input may be received by way of textual input and or menu selections 120 to define design specification 116. Design specification 116 may include, for example, a plurality of functions designated to be implemented in final user interface 104, and relationship information describing how the plurality of functions relate to each other. The relationship information may be received in a form of a hierarchy of groups, each group comprising one or more of a state variable, a command, and textual information.

Specification 116 may be written in a language based on, e.g., the PUC specification language described by Jeffrey Nichols and Brad A. Myers, *Creating a lightweight user interface description language: An overview and analysis of the personal universal controller project, ACM Trans. Comput.-Hum. Interact.* (2009), 16 (4). 1-37. 10.1145/1614390.1614392, the subject matter of which is incorporated by reference. Like the PUC language, specification 116 may include a hierarchy of groups that may contain state variables or commands. State variables may have types, such as Boolean or string. Textual labels may be specified for most items in the language.

Automated design interface 114 includes software (e.g., as part of executable instructions 110) that, based on design specification 116, may generate a design tree 122 of design actions. Design tree 122 may generate candidate user interface designs 106 based on design actions that change in response to different traversal paths of the design tree and/or input associated with designer interface 102. Each intermediary node of the tree represents a partial user interface design, and each branch of the tree representing a design action that creates or modifies the partial user interface design.

Executable instructions 110 may determine a plurality of candidate user interface designs 106 and a corresponding plurality of design scores for the designs. Each candidate design 106 represents a completed (prototype) user interface that implements the functions of received specification 116. To generate each candidate interface design, the tree is traversed along a different path from a root node of the tree to a leaf node of the tree, and respective design actions represented by branches along the traversal path are executed. In this regard, each branch represents a potential action taken to construct user interface 104, nodes within the tree represent partially designed interfaces, and each leaf node in the tree represents a complete user interface. For example, one type of action might be placing a particular UI widget, such as a button, on a screen to represent a needed function. A design score is calculated for each candidate user interface design 116 based on an evaluation of the candidate user interface design using a predetermined evaluation algorithm. Evaluators are employed to rank the quality of the candidate interface designs, and may be based on heuristics, models of human performance, or both.

The tree may be traversed a predetermined number of iterations (e.g., ten, twenty, one hundred, one thousand, etc.), until a predetermined threshold design score is reached, or until every possible path has been traversed. Once the candidate user interface designs 116 have been determined, a selected completed interface design is selected from the candidate interface designs based on the plurality of design scores, and instructions 110 generate user interface 104 based on the selected candidate user interface design.

Figure 2:
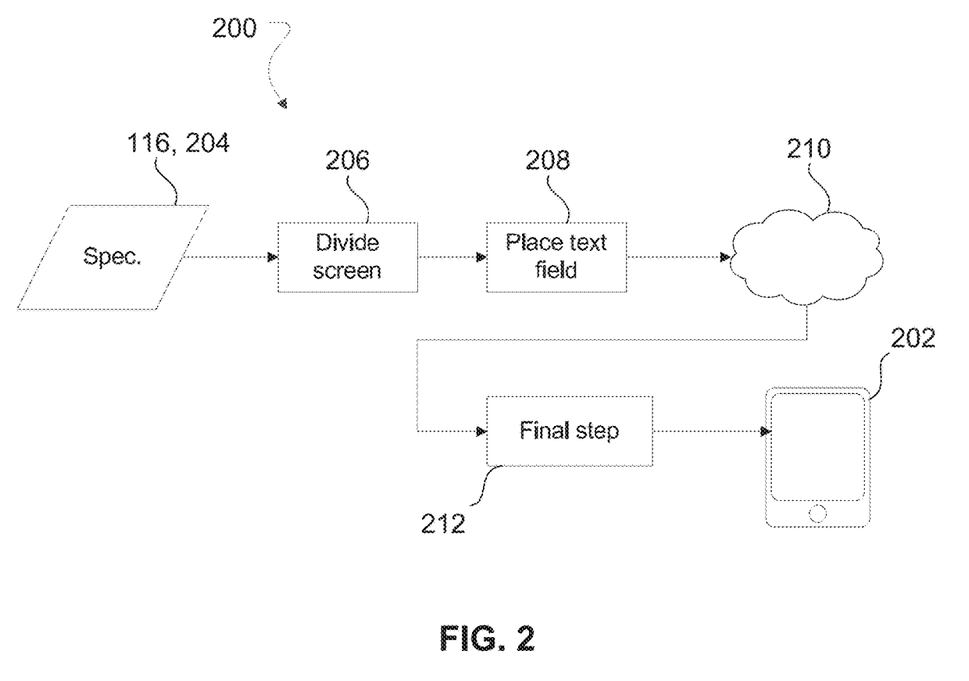
FIG. 2 depicts an example abbreviated series of design "actions" that result in a complete user interface for a target computing device.

FIG. 2 depicts an example abbreviated series of design "actions" 200 that result in a complete user interface for a target computing device 202, according to various aspects of the subject technology. In the depicted example, a specification 116 is received 204, a user interface screen is divided 206 based on, e.g., functions in the specification, text fields are positioned 208 on the interface screen, and other actions 210 are taken and implemented according to design choices made during traversal of design tree 122. In a final step 212, final design choices such as authentication may be implemented. The final user interface 104 may then be displayed by designer interface 102 on computing device 108. The example design actions 200 are representative of only one possible design solution, and the subject technology is not limited as such. Different design choices will ultimately lead to any number of different user interface designs. User interfaces determined by the subject technology may include, for example, e-mail clients, FTP clients, photo sharing clients, podcast applications, printer dialogs, to do list applications, music applications, etc.

Figure 3:
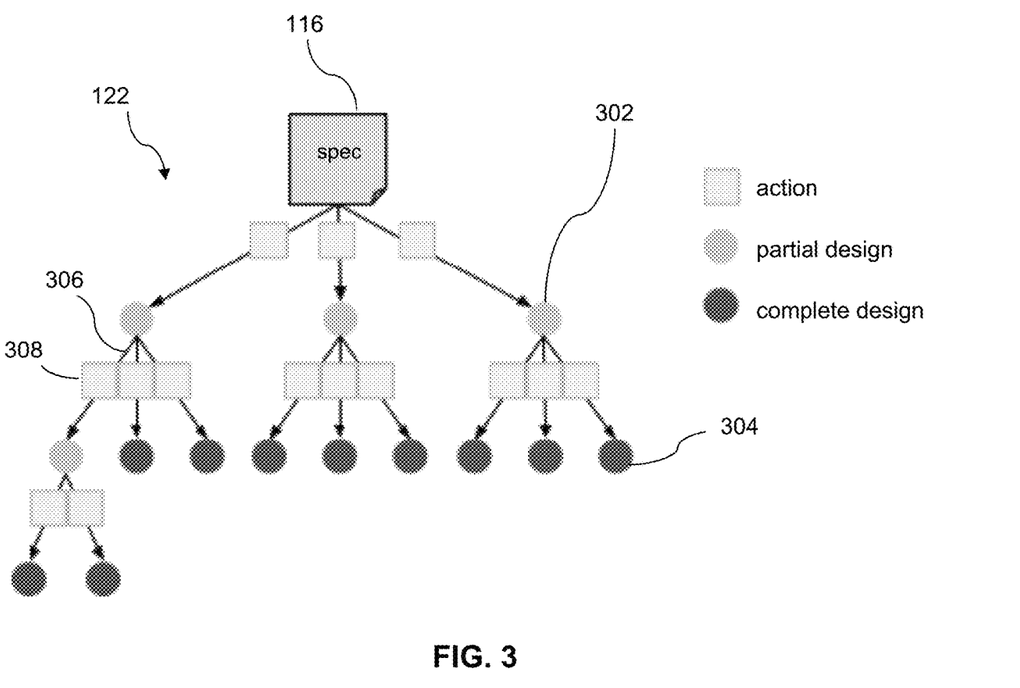
FIG. 3 depicts an example design tree that represents a design space of all possible interfaces that may be implemented in an example final user interface design.
Figure 4A:
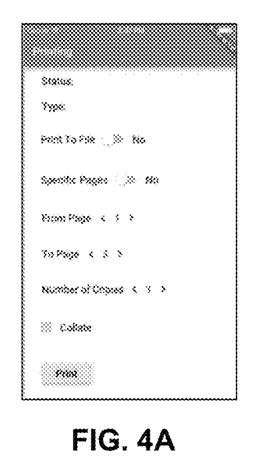
FIG. 4A-4D depicts examples of final user interfaces created by the example designer interface.
Figure 4B:
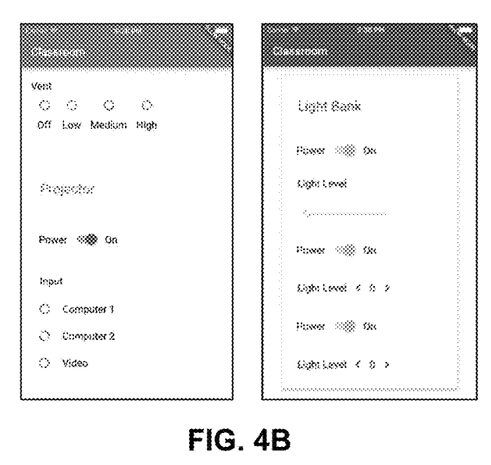
Figure 4C:
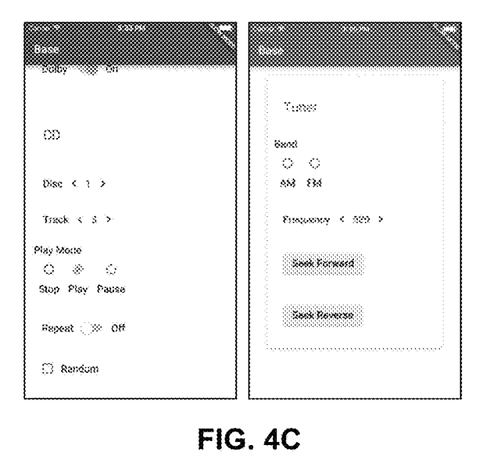
Figure 4D:
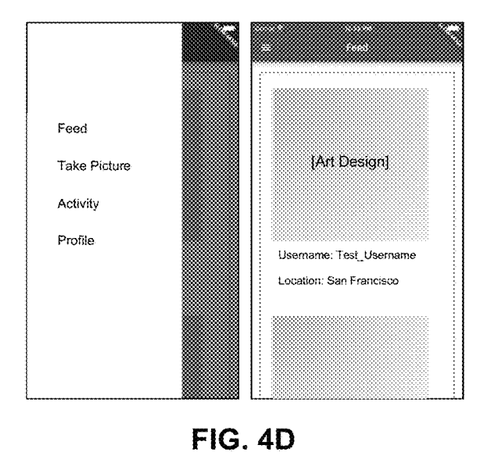

FIG. 3 depicts an example design tree 122 that represents a design space of all possible interfaces that may be implemented in an example final user interface design, according to various aspects of the subject technology. Within design tree 122, each node 302 with children represents a partial design of a user interface, leaf nodes 304 represent a complete candidate user interface design 106, and each branch 306 represents a particular design action 308 taken at that point in a traversal of the tree. Design tree 122 is presented as an example, and a realistic application of the tree may be much larger in terms of width and depth. The width of the tree may be influenced by the number of actions available at any step, which in a realistic scenario would be substantial and grow exponentially as the tree deepens. Depth corresponds to the number of actions taken to produce a final user interface 104. The number of actions needed to complete an interface is likely proportional to the number of interface elements used in the final design, which may be in the low thousands for a complex interface. Design tree may be much wider than it is tall.

Design Actions

A design action 308 may include anything that a user might do to modify the user interface currently under construction. A branch 306 may exist in design tree 122 for each combination of its parameters of an action type. For example, for a widget assignment action type, there may be a branch for each item in the specification that has not yet been assigned a widget and a branch for each widget type that might be assigned to that item. The more parameter options that an action type has, the greater the branching factor in design tree 122. The number and types of design actions to support in design tree 122 may affect both the performance of the generator and the diversity of designs that may be created.

Some example design action types include merging specification groups into a single larger group, choosing an overall layout pattern for a screen (e.g., list or grid), assigning a widget to an item in the specification, place a widget as the next item on a screen, placing a label on a screen associated with a widget, and increasing or decreasing the text size for a label or a widget. These and others are described below in Table 1.

TABLE 1

Action Types

| Action Type | Description |
| --- | --- |
| Group Merge | Merges the children of a specification group into its parent, removing the group. |
| Page Layout | Chooses either a grid or list-style layout for a panel. |
| Sibling Separation | Chooses how to separate sub-groups displayed on one screen: separator, cards, etc. |
| Subgroup Navigation | Chooses whether sub-groups below the top level require navigation and, if so, what type |
| Text Size | Chooses a text size for a label or widget. |
| Top Group Navigation | Chooses the top-level navigation style for the application: tabs, carousel, etc. |
| Widget Type | Chooses the widget type for a state variable or command. |

Each node level of design tree 122 may implement a different type of design action. According to various implementations, the branches of a first node at a first node level of the tree correspond to different design actions for merging a first group of the hierarchy of groups into a second group of the hierarchy of groups. As depicted in FIG. 3, specification 116 may be representative of the first, or root, node, and Group Merge actions may be the first actions taken on specification 116.

The design actions may be implemented, for example, by computing device 108, or design software stored thereon. In some implementations, one or more of design actions may be implemented apart from other design actions, and by one or more different processors or computing devices. Also, for explanatory purposes, the design actions are described as occurring in serial, or linearly. However, multiple design actions may occur in parallel, and design actions need not be performed in a particular order and/or one or more of the design actions described herein need not be performed.

In some implementations, branches of a second node at a second node level of the tree may correspond to different widget types for a respective function of the plurality of functions. In this regard, automated design interface 114 selects, when a respective branch of the second node is traversed, a widget type of the different widget types provided by the branches of the node. Accordingly, a widget of the selected widget type is placed into the generated user interface for the respective function when the branch corresponding to the widget type is in the traversal path.

The branches of another node at another node level of the tree may correspond to different page layouts for a panel of the user interface. The page layouts may include, e.g., a grid layout and a list-style layout. One of these page layouts is selected when the branch corresponding to the selected page layout is in the traversal path.

The branches of another node at another node level of the tree may correspond to different separators for a panel of the user interface. When design tree 122 is traversed, automated design interface 114 may identify different sub-groups of items to be displayed on the panel of the user interface, and select a selected separator of the different separators for the identified different sub-groups based on a traversal of a branch corresponding to the selected separator. Accordingly, two or more different sub-groups may be separated from each other based on the selected separator.

The branches of another node at another node level of the tree may correspond to predetermined navigation types for the user interface. The navigation types may include, e.g., top-level navigation tabs and a top-level navigation carousal. When design tree 122 is traversed, automated design interface 114 may select a navigation type for the user interface based on a traversal of a branch corresponding to the selected navigation type.

The design software of automated design interface 114 may implement few powerful actions or many less powerful actions or laying out components in a user interface design. In some implementations, a simple powerful action may support the single action of placing a given widget at a specific pixel location on the screen. Through multiple coordinated uses of this action, the system may create complete layouts like lists and grids by placing each widget at a determined location. Additionally or in the alternative, a less powerful action may include more granularity in design choices than a powerful action but may include two actions: one to choose a layout style for a given screen, such as a list or grid, and another to place a widget in the next available open space within the layout style. Many less powerful actions may more often lead to a valid interface design. Limiting the size of the design space may make the design tree smaller, enabling the tree exploration conducted by the interface generation algorithm to be more complete and take less time.

Automated design interface 114 may include action types that reverse changes introduced by a previous action. For example, a "delete widget" action may undo previous actions that created widgets for items in the specification. In another example, "change font size" applied multiple times to the same content. Predetermined actions and/or action types may be ordered in the design space tee. Automated design interface 114 may implement predetermined action ordering constraints, such as requiring widgets to be assigned to items in the order they appear in the specification. Constraining the order of actions may reduce the branching factor of the design tree, conserving resources and improving run time.

Design as Tree Search

As described previously, design tree 122 may be traversed from the root to a leaf node, carrying out each of the actions along the way, resulting in a complete user interface. The interface may be evaluated automatically according to a predetermined set of principles or algorithm. Information about the search traversal and the resulting interface may be stored to guide future searches. The foregoing steps may be repeated until a stopping condition is reached, e.g., often after a predetermined number of iterations.

Evaluating User Interface Designs

Automated design interface 114 may automatically evaluate a user interface design, when generated by the design software. Evaluation methods may be executed after each traversal of design tree 122 and their results are used to guide subsequent traversals of the tree. In some examples, thousands of scores may be generated before a final design is chosen.

Some evaluation methods may include:
  Easy to calculate heuristics that may be related to design quality such as: interface area that is scrolled off screen, visible unused area on screen, number of total screens, etc.
  The number of interaction steps needed to get between interface elements used as part of a task).
  Physiological models of human performance (e.g., visual clutter, visual search, target acquisition, grid symmetry, and color harmony). Some of these, such as target acquisition and visual search, may be calculated in terms of the tasks to be performed with the interface or based on the overall design.
  A similarity metric comparing a sub-tree and a known design pattern or a frequent grouping of UI controls. Such patterns and groupings of UI controls could come from existing design mining projects.
  Deep neural network models trained from human scores of real user interfaces, e.g., similar to a value network.

Multiple evaluation methods may be utilized simultaneously, and respective evaluation scores may be combined with weighting factors to obtain a final evaluation score. For example, a series of heuristic scores may be combined with physiological model evaluation scores based on visual search and target acquisition. In some implementations, automated design interface 114 may utilize a tiered evaluation approach, in which the top n results from a search are evaluated to determine a final result. In scenarios without time constraints, designs may be evaluated and scored by real humans, either through crowdsourcing platforms or in a traditional user research lab setting.

Some example evaluation algorithms are further described below in Table 2.

TABLE 2

Example Evaluation Algorithms

| Action Type | Description |
| --- | --- |
| Info Not Displayed | Penalty for not showing information provided in specification (e.g., a value label on a spinner). |
| Info Not Provided | Penalty for showing default information not in specification (e.g., choosing a widget that requires an unspecified label). |
| # of Screens | Provides bias towards a minimal number of screens. |
| Max Scroll Ratio | Maximum ratio across all screens of UI screen height/device screen height. Penalizes scrolling. |
| Average Scroll Ratio | Same as above, but average across all screens. Also penalizes scrolling. |
| Max Unused Ratio | Maximum ratio across all screens of 1 - (UI screen area/device screen area). Penalizes unused screen space. |
| Average Unused Ratio | Same as above, but average across all screens. Also unused screen space. |
| Horizontal Scroll | penalizes use of horizontal scrolling (a frequent occurrence with radio buttons). |
| # of Steps to Complete Task | For each task trace, counts the number of interactive steps to complete the task. Based on task trace term |
| Design Inconsistency | For each screen, counts different decisions made with same input. For example, two Boolean states appearing as different widget (e.g., checkbox and toggle). |
| Visual Search | A model of visual search. Averages search cost over each screen. |
| Target Acquisition | A Fitts' Law based model. Counts cost of target acquisition for each task trace. |

As described previously, a design score for each candidate user interface design is calculated based on an evaluation of the candidate user interface design using a predetermined evaluation algorithm. Each leaf 304 of design tree 122 may initiate one or more of the evaluation algorithms listed in Table 2 to evaluate a candidate interface design 106 corresponding to the leaf. In some implementations multiple evaluation algorithms may be utilized to calculate the design score for the candidate user interface design.

As a further example, a first evaluation algorithm may calculate the design score based on an amount of the plurality of functions and relationship information implemented by a respective candidate user interface design 106. A second evaluation algorithm may identify whether the respective candidate user interface design 106 includes default information not in a received plurality of functions and relationship information, and reduce or increase the calculated design score when the default information is or is not identified. A third evaluation algorithm may calculate the design score based on an amount of screens implemented in the respective candidate user interface design. A fourth evaluation algorithm may calculate the design score based on a height to width ratio of the screens implemented in the respective candidate user interface design. A fifth evaluation algorithm may calculate the design score based unused screen space in the respective candidate user interface design. A sixth evaluation algorithm may identify whether the respective candidate user interface design includes horizontal scrolling of one or more screens, and reduce the calculated design score if the horizontal scrolling is identified. A seventh evaluation algorithm may identify a task based on the received plurality of functions and relationship information, and a number of user-interactions required to initiate and complete the task, and calculate the design score based on the identified number of user-interactions. An eighth evaluation algorithm may determine a count of different decisions made based on a same user-interaction input, and reduce the calculated design score based on the determined count. A ninth evaluation algorithm may identify a task based on the received plurality of functions and relationship information, and identify a target associated with the task in a screen of the respective candidate user interface design, determine an estimated amount of time for a user to move to and select the target, and calculate (and/or adjust) the design score based on the estimated amount of time.

The design score may be calculated based on a linear combination of the evaluation algorithms. Calculation of the design score, as applied to each algorithm, may include calculation of a new design score, or recalculation or adjustment of an existing calculated design score. The results of each these evaluators may be linearly combined into a weighted score, and the final user interface 104 generated based on the candidate interface 106 design having the lowest score. Is some implementations, weights may be set manually based on experimentation.

Searching the Design Space

To discover an ideal final user interface 104, an exhaustive search of design tree 122 may be undertaken. Additionally or in the alternative, automated design interface 114 may utilize a Monte Carlo tree search (MCTS) to determine candidate interface designs 106. Some benefits of using MCTS when traversing design tree 122 of the subject technology include:

- Design tree 122 may be built incrementally, thus not requiring the tree (which may be quite large) to ever be fully instantiated.
- Design tree 122 may be explored asymmetrically according to a policy, which balances exploration of unknown areas of the tree versus exploiting known good branches.
- The values of intermediate states in the tree may not have to be evaluated and only the value of terminal states may be determined. This may correspond to evaluating a candidate user interface 106, as discussed above. Many optimization and game-playing algorithms may require evaluation of intermediate states, which may correspond to the task of evaluating an unfinished user interface design.
- Domain knowledge may not required for the algorithm to work, and in the default case MCTS may choose randomly when it does not have any information to guide its next choice. The algorithm may be improved by providing information about which actions are likely to be more fruitful based on previous searches.

In instances in which a tree would be too large to completely instantiate (e.g., due to memory constraints), the traversal algorithm may implement an incremental property of the MCTS method. In such implementations, portions of the design tree may be constructed as they are explored during the search.

A basic implementation of MCTS may include the following steps:

- Selection: Starting from the root, a selection policy may be applied recursively to traverse to the node that the policy considers the most relevant to expand next. This may be called the most urgent expandable node.
- Expansion: An action may be chosen from those available, which produces a child node that expands the tree.
- Simulation: A simulation policy may be applied to recursively continue down the tree until a terminal node is reached. The resulting interface may be evaluated to produce a design score.

Backpropagation: The score may be propagated back (or "backed up") through the traversed nodes to update their statistics, which may affect future choices made by the selection policy.

The Upper Confidence Bound for Trees approach (UCT) may be utilized as a selection policy. In this regard, nodes that have already been visited may be ignored in favor of exploring new nodes. Simulation policy may include random sampling across all available actions, or weighted sampling across all available actions learned from previous search results on other specifications. The latter approach biases the simulation policy in terms of actions that were found to be beneficial in previous searches.

In some implementations, for each traversal, the result of the entire traversal and completed candidate user interface design 106 may be saved rather than just the node(s) that the selection policy of the traversal algorithm chose to expand. In some implementations, sub-trees that have been completely explored are tracked and the traversal algorithm does not allow further traversals into these sub-trees. The best overall interface design found across all traversals may be tracked and returned as output.

Specification 116 may be augmented with an optional preferences section that allows designers to specify preferred actions for a given context. For example, a designer may express a preference that all Boolean states should be rendered as radio buttons instead of checkboxes. During simulation, preferred actions may receive an increased weight compared to other actions, making it statistically highly likely that the preferred action will be explored first among its peers. If the preference results in a good (low) scoring interface, then alternatives including this preference are likely to continue to be explored by MCTS. There is still a chance that a better option may be found, in which case the preference may be disregarded. Additionally or in the alternative, candidate interface designs may receive a slight bonus to their score when a preference is incorporated. This bonus may be included to add a threshold over which alternative designs must provide an advantage in order for the preference to be ignored.

FIG. 4 depicts examples of final user interfaces 104 created by the example designer interface 102 of the subject technology. FIG. 4A depicts a Printer Dialog, FIG. 4B depicts a Classroom Presentation, FIG. 4C depicts a music application, and FIG. 4D depicts a photo sharing application. The example interfaces were created by randomly generating a specification 116, from which a plurality of candidate user interface designs 106 were determined using designer interface 102, and then selecting the depicted interfaces based on design scores generated for each candidate interface design 106.

Figure 5:
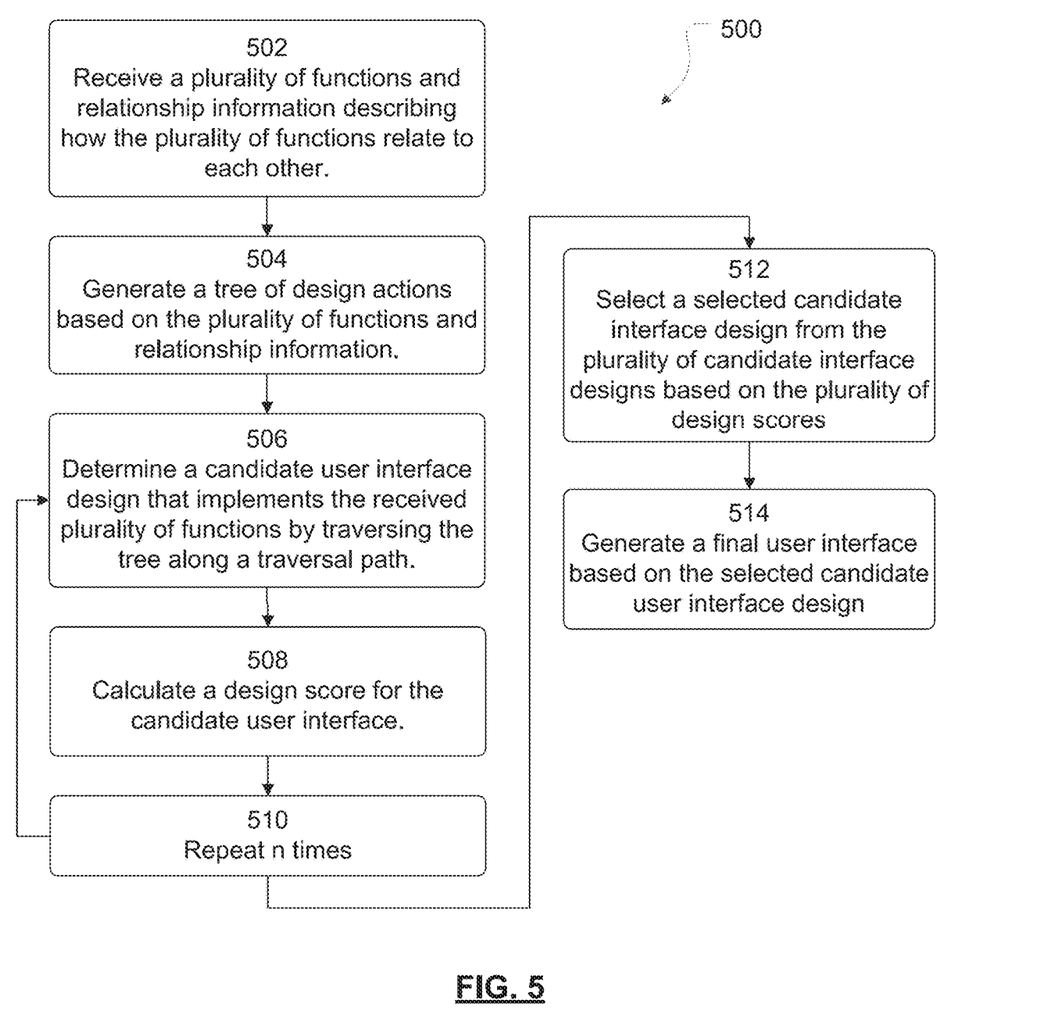
FIG. 5 depicts a second example process for automated generation of a final user interface based on candidate user interface designs.

FIG. 5 depicts a second example process for automated generation of a final user interface based on candidate user interface designs, according to aspects of the subject technology. For explanatory purposes, the various blocks of example process 400 are described herein with reference to FIGS. 1-3, and the components and/or processes described herein. The one or more of the blocks of process 500 may be implemented, for example, by computing device 108, including a processor and other components utilized by device 108. In some implementations, one or more of the blocks may be implemented apart from other blocks, and by one or more different processors or devices. Further for explanatory purposes, the blocks of example process 500 are described as occurring in serial, or linearly. However, multiple blocks of example process 500 may occur in parallel. In addition, the blocks of example process 500 need not be performed in the order shown and/or one or more of the blocks of example process 500 need not be performed.

In the depicted example flow diagram, automated design interface 114 receives, for a user interface to be generated, a plurality of functions and relationship information describing how the plurality of functions relate to each other (502). The relationship information may be received in a form of a hierarchy of groups, each group comprising one or more of a state variable, a command, and textual information.

Automated design interface 114 generates a tree 122 of design actions (e.g., automatically) based on the plurality of functions and relationship information (504). Each intermediary node of the tree may represent a partial user interface design, and each branch of the tree represents a design action that creates or modifies the partial user interface design.

Each node level of design tree 122 may be representative of a different type of design action. Each node at a respective node level may perform the same or similar type of design action for a different traversal path of tree 122. For explanatory purposes, the design actions are discussed with respect to a first or second node, at a first and second node levels, respectively. The second node level, however, need not be a subsequent node from the first node, or reside at a node level directly under or over the first node.

According to various implementations, the branches 306 of a first node at a first node level of the tree may correspond to different design actions for merging a first group of the hierarchy of groups into a second group of the hierarchy of groups. The branches of a second node at a second node level of the tree correspond to different widget types for a respective function of the plurality of functions. In this example, automated design interface 114 may select a selected widget type of the different widget types based on a traversal of a branch of the second node corresponding to the selected widget type, and place a widget of the selected widget type into the generated user interface for the respective function when the branch corresponding to the widget type is in the traversal path of the selected candidate user interface design.

The branches 306 of a second node at a second node level of the tree correspond to different page layouts for a panel of the user interface, the page layouts comprising a grid layout and a list-style layout. In this regard, automated design interface 114 may select a selected page layout of the different page layouts based on a traversal of a branch of the second node corresponding to the selected page layout.

The branches of a second node at a second node level of the tree correspond to different separators for a panel of the user interface. In this regard, automated design interface 114 may identify different sub-groups of items to be displayed on the panel of the user interface, and select a selected separator of the different separators for the identified different sub-groups based on a traversal of a branch of the second node corresponding to the selected separator. According to various implementations, two or more of the identified different sub-groups are separated from each other based on the selected separator.

The branches of a second node at a second node level of the tree may correspond to predetermined navigation types for the user interface. In this regard, automated design interface 114 may select a selected navigation type of the predetermined navigation types for the user interface based on a traversal of a branch of the second node corresponding to the selected navigation type. The selected navigation type may be selected from a plurality of predetermined top-level navigation types comprising top-level navigation tabs and a top-level navigation carousal.

Automated design interface 114 determines (e.g., automatically) a candidate user interface design 106 that implements the received plurality of functions by automatically traversing tree 122 along a traversal path (506). The traversal path may be from a root node of the tree to a leaf node of the tree and executing respective design actions represented by branches along the traversal path. During the traversal, a branch along the traversal path may be selected based on scores associated with the nodes. In this regard, automated design interface 114 may determine, for a respective intermediary node, an aggregate score that aggregates design scores for candidate user interface designs determined using respective traversal paths that include the respective intermediary node. When the tree 122 is traversed, a branch along the traversal path is selected from a plurality of branches 306 based on respective aggregate scores of each node associated with each of the plurality of branches. Additionally of in the alternative, automated design interface 114 may determine an intermediary node for which all branches of the intermediary node have been explored, and exclude the intermediary node from a future traversal path.

Automated design interface 114 calculates (e.g., automatically) a design score for each candidate user interface design 106 (508). The design score may be based on an evaluation of the candidate user interface design using a predetermined algorithm. According to various implementations, the predetermined evaluation algorithm comprises one or more of a group of evaluation algorithms. For example, a first evaluation algorithm may calculate the design score based on an amount of the plurality of functions and relationship information implemented by the respective candidate user interface design. A second evaluation algorithm may identify whether the respective candidate user interface design includes default information not in the received plurality of functions and relationship information, and reduce the calculated design score when the default information is identified.

A third evaluation algorithm may calculate the design score based on an amount of screens implemented in the respective candidate user interface design. A fourth evaluation algorithm may calculate the design score based on a height to width ratio of the screens implemented in the respective candidate user interface design. A fifth evaluation algorithm may calculate the design score based unused screen space in the respective candidate user interface design. A sixth evaluation algorithm may identify whether the respective candidate user interface design includes horizontal scrolling of one or more screens, and reduce the calculated design score if the horizontal scrolling is identified. A seventh evaluation algorithm may identify a task based on the received plurality of functions and relationship information, and a number of user-interactions required to initiate and complete the task, and calculate the design score based on the number of user-interactions. An eighth evaluation algorithm may determine a count of different decisions made based on a same user-interaction input, and reduces the calculated design score based on the determined count. And, a ninth evaluation algorithm may identify a task based on the received plurality of functions and relationship information, and may identify a target associated with the task in a screen of the respective candidate user interface design, and determine an estimated amount of time for a user to move to and select the target, and adjust the design score based on the amount of time.

According to various implementations, the predetermined evaluation algorithm may include any combination of the foregoing evaluation algorithms (e.g., two or more). Additionally or in the alternative, the design score for the respective candidate user interface design may be calculated based on a linear combination of the evaluation algorithms.

The determining and calculating steps are repeated (e.g., automatically) to generate a plurality of candidate user interface designs and a corresponding plurality of design scores (510). The steps may be repeated a predetermined number of times, or until at least one of the plurality of design scores satisfies a threshold design score.

Automated design interface 114 then selects (e.g., automatically) a selected completed interface design from the plurality of completed interface designs 106 based on the plurality of design scores (512), and generates a user interface (514) based on the selected candidate user interface design.

Many of the above-described example 500, and related features and applications, may also be implemented as software processes that are specified as a set of instructions recorded on a computer readable storage medium (also referred to as computer readable medium), and may be executed automatically (e.g., without user intervention). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

The term "software" is meant to include, where appropriate, firmware residing in read-only memory or applications stored in magnetic storage, which can be read into memory for processing by a processor. Also, in some implementations, multiple software aspects of the subject disclosure can be implemented as sub-parts of a larger program while remaining distinct software aspects of the subject disclosure. In some implementations, multiple software aspects can also be implemented as separate programs. Finally, any combination of separate programs that together implement a software aspect described here is within the scope of the subject disclosure. In some implementations, the software programs, when installed to operate on one or more electronic systems, define one or more specific machine implementations that execute and perform the operations of the software programs.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

Figure 6:
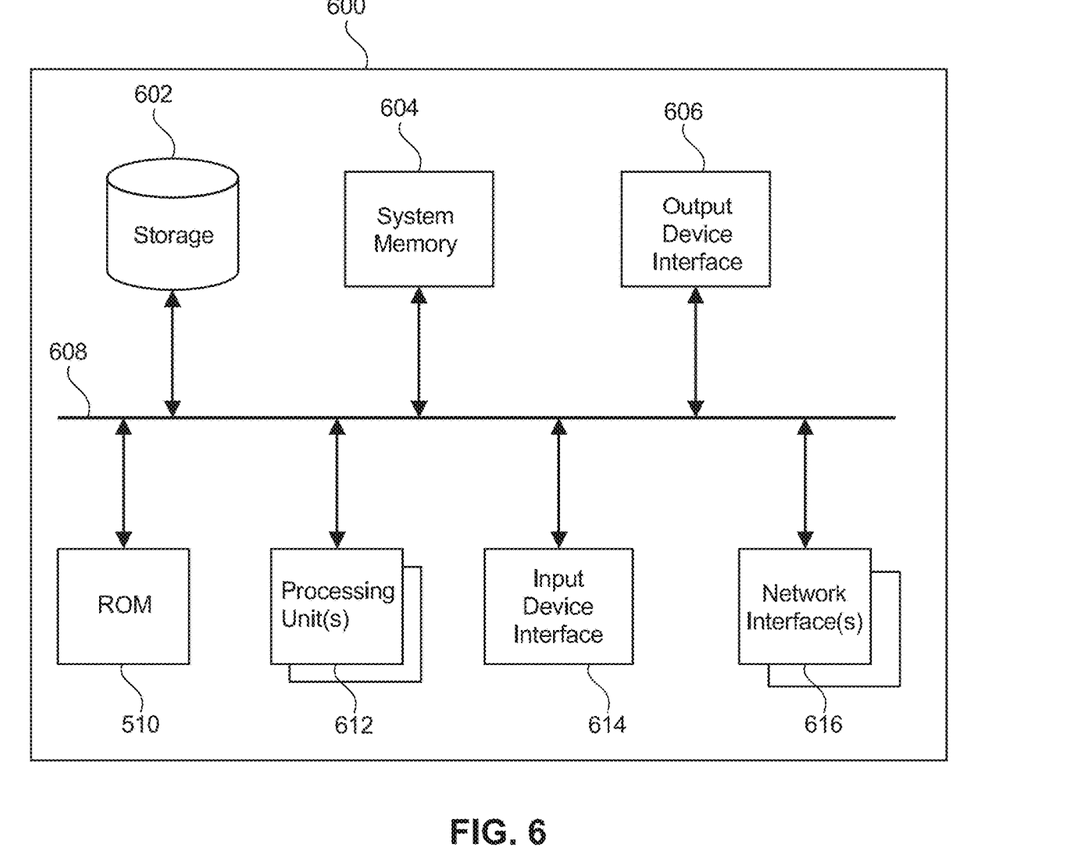
FIG. 6 is a diagram illustrating an example electronic system for automated generation of a final user interface based on candidate user interface designs.

FIG. 6 is a diagram illustrating an example electronic system 600 for automated generation of a final user interface based on candidate user interface designs, according to one or more aspects of the subject technology. Electronic system 600 may be a computing device for execution of software associated with one or more portions or steps of process 600, or components and processes provided by FIGS. 1-3. Electronic system 600 may be representative, in combination with the disclosure regarding FIGS. 1-5, of computing device 108 or computing device 202. In this regard, electronic system 600 or computing device 108 or 202 may be a personal computer or a mobile device such as a smartphone, tablet computer, laptop, PDA, an augmented reality device, a wearable such as a watch or band or glasses, or combination thereof, or other touch screen or television with one or more processors embedded therein or coupled thereto, or any other sort of computer-related electronic device having network connectivity.

Electronic system 600 may include various types of computer readable media and interfaces for various other types of computer readable media. In the depicted example, electronic system 600 includes a bus 608, processing unit(s) 612, a system memory 604, a read-only memory (ROM) 610, a permanent storage device 602, an input device interface 614, an output device interface 606, and one or more network interfaces 616. In some implementations, electronic system 600 may include or be integrated with other computing devices or circuitry for operation of the various components and processes previously described.

Bus 608 collectively represents all system, peripheral, and chipset buses that communicatively connect the numerous internal devices of electronic system 600. For instance, bus 608 communicatively connects processing unit(s) 612 with ROM 610, system memory 504, and permanent storage device 602.

From these various memory units, processing unit(s) 612 retrieves instructions to execute and data to process in order to execute the processes of the subject disclosure. The processing unit(s) can be a single processor or a multi-core processor in different implementations.

ROM 610 stores static data and instructions that are needed by processing unit(s) 612 and other modules of the electronic system. Permanent storage device 602, on the other hand, is a read-and-write memory device. This device is a non-volatile memory unit that stores instructions and data even when electronic system 600 is off. Some implementations of the subject disclosure use a mass-storage device (such as a magnetic or optical disk and its corresponding disk drive) as permanent storage device 502.

Other implementations use a removable storage device (such as a floppy disk, flash drive, and its corresponding disk drive) as permanent storage device 602. Like permanent storage device 602, system memory 604 is a read-and-write memory device. However, unlike storage device 602, system memory 604 is a volatile read-and-write memory, such a random access memory. System memory 604 stores some of the instructions and data that the processor needs at runtime. In some implementations, the processes of the subject disclosure are stored in system memory 604, permanent storage device 602, and/or ROM 610. From these various memory units, processing unit(s) 612 retrieves instructions to execute and data to process in order to execute the processes of some implementations.

Bus 608 also connects to input and output device interfaces 614 and 606. Input device interface 614 enables the user to communicate information and select commands to the electronic system. Input devices used with input device interface 614 include, e.g., alphanumeric keyboards and pointing devices (also called "cursor control devices").

Output device interfaces 606 enables, e.g., the display of images generated by the electronic system 600. Output devices used with output device interface 606 include, e.g., printers and display devices, such as cathode ray tubes (CRT) or liquid crystal displays (LCD). Some implementations include devices such as a touchscreen that functions as both input and output devices.

Finally, as shown in FIG. 6, bus 608 also couples electronic system 600 to a network (not shown) through network interfaces 616. Network interfaces 616 may include, e.g., a wireless access point (e.g., Bluetooth or WiFi) or radio circuitry for connecting to a wireless access point. Network interfaces 616 may also include hardware (e.g., Ethernet hardware) for connecting the computer to a part of a network of computers such as a local area network ("LAN"), a wide area network ("WAN"), wireless LAN, or an Intranet, or a network of networks, such as the Internet. Any or all components of electronic system 500 can be used in conjunction with the subject disclosure.

These functions described above can be implemented in computer software, firmware or hardware. The techniques can be implemented using one or more computer program products. Programmable processors and computers can be included in or packaged as mobile devices. The processes and logic flows can be performed by one or more programmable processors and by one or more programmable logic circuitry. General and special purpose computing devices and storage devices can be interconnected through communication networks.

Some implementations include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media can store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some implementations are performed by one or more integrated circuits, such as application specific integrated circuits (ASICs) or field programmable gate arrays (FPGAs). In some implementations, such integrated circuits execute instructions that are stored on the circuit itself.

As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium" and "computer readable media" are entirely restricted to tangible, physical objects that store information in a form that is readable by a computer. These terms exclude any wireless signals, wired download signals, and any other ephemeral signals.

To provide for interaction with a user, implementations of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; e.g., feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; e.g., by sending web pages to a web browser on a user's client device in response to requests received from the web browser.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), an internetwork (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

Those of skill in the art would appreciate that the various illustrative blocks, modules, elements, components, methods, and algorithms described herein may be implemented as electronic hardware, computer software, or combinations of both. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the overall system. Skilled artisans may implement the described functionality in varying ways for each particular application. Various components and blocks may be arranged differently (e.g., arranged in a different order, or partitioned in a different way) all without departing from the scope of the subject technology.

It is understood that the specific order or hierarchy of steps in the processes disclosed is an illustration of example approaches. Based upon design preferences, it is understood that the specific order or hierarchy of steps in the processes may be rearranged. Some of the steps may be performed simultaneously. The accompanying method claims present elements of the various steps in a sample order, and are not meant to be limited to the specific order or hierarchy presented.

The previous description is provided to enable any person skilled in the art to practice the various aspects described herein. The previous description provides various examples of the subject technology, and the subject technology is not limited to these examples. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the invention.

The term website, as used herein, may include any aspect of a website, including one or more web pages, one or more servers used to host or store web related content, etc. Accordingly, the term website may be used interchangeably with the terms web page and server. The predicate words "configured to", "operable to", and "programmed to" do not imply any particular tangible or intangible modification of a subject, but, rather, are intended to be used interchangeably. For example, a processor configured to monitor and control an operation or a component may also mean the processor being programmed to monitor and control the operation or the processor being operable to monitor and control the operation. Likewise, a processor configured to execute code can be construed as a processor programmed to execute code or operable to execute code.

The term automatic, as used herein, may include performance by a computer or machine without user intervention; for example, by instructions responsive to a predicate action by the computer or machine or other initiation mechanism. The word "example" is used herein to mean "serving as an example or illustration." Any aspect or design described herein as "example" is not necessarily to be construed as preferred or advantageous over other aspects or designs.

A phrase such as an "aspect" does not imply that such aspect is essential to the subject technology or that such aspect applies to all configurations of the subject technology. A disclosure relating to an aspect may apply to all configurations, or one or more configurations. An aspect may provide one or more examples. A phrase such as an aspect may refer to one or more aspects and vice versa. A phrase such as an "embodiment" does not imply that such embodiment is essential to the subject technology or that such embodiment applies to all configurations of the subject technology. A disclosure relating to an embodiment may apply to all embodiments, or one or more embodiments. An embodiment may provide one or more examples. A phrase such as an "embodiment" may refer to one or more embodiments and vice versa. A phrase such as a "configuration" does not imply that such configuration is essential to the subject technology or that such configuration applies to all configurations of the subject technology. A disclosure relating to a configuration may apply to all configurations, or one or more configurations. A configuration may provide one or more examples. A phrase such as a "configuration" may refer to one or more configurations and vice versa.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for." Furthermore, to the extent that the term "include," "have," or the like is used in the description or the claims, such term is intended to be inclusive in a manner similar to the term "comprise" as "comprise" is interpreted when employed as a transitional word in a claim.

What is claimed is:

1. A method, comprising:
generating, in a computer memory, a tree of design actions based on a design specification for generating a graphical user interface, each intermediary node of the tree representing a partial user interface design, and each branch of the tree representing a design action that creates or modifies the partial user interface design;
automatically determining a plurality of candidate user interface designs, each implementing the design specification, by automatically traversing the tree of design actions along multiple traversal paths from a root node of the tree to respective leaf nodes of the tree and executing respective design actions represented by branches along the traversal paths;
identifying a selected candidate interface design of the plurality of candidate interface designs; and
generating the graphical user interface based on the identified selected candidate user interface design.

2. The method of claim 1, further comprising:
creating a respective candidate user interface design that implements the design specification by traversing the tree along a respective traversal path from the root node of the tree to a respective leaf node of the tree and executing respective design actions represented by branches along the traversal path;
automatically calculating a design score for the respective candidate user interface design based on an evaluation of the respective candidate user interface design;
automatically repeating the creating and calculating steps to generate the plurality of candidate user interface designs and a corresponding plurality of design scores; and
automatically selecting the selected candidate interface design from the plurality of candidate interface designs based on the plurality of design scores.

3. The method of claim 2, further comprising:
determining, for a respective intermediary node, an aggregate score that aggregates design scores for candidate user interface designs determined using respective traversal paths that include the respective intermediary node,
wherein, when the tree is traversed, a branch along the traversal path is selected from a plurality of branches based on respective aggregate scores of each node associated with each of the plurality of branches.

4. The method of claim 2, further comprising:
determining an intermediary node for which all branches of the intermediary node have been explored; and
excluding the intermediary node from a future traversal path.

5. The method of claim 2, wherein the design specification is received via a design interface and comprises a hierarchy of groups, each group comprising one or more of a state variable, a command, and textual information.

6. The method of claim 5, wherein the branches of a first node at a first node level of the tree correspond to different design actions for merging a first group of the hierarchy of groups into a second group of the hierarchy of groups.

7. The method of claim 6, wherein the design specification comprises a plurality of functions, and wherein the branches of a second node at a second node level of the tree correspond to different widget types for a respective function of the plurality of functions, the method further comprising:
selecting a selected widget type of the different widget types based on a traversal of a branch of the second node corresponding to the selected widget type; and
placing a widget of the selected widget type into the generated graphical user interface for the respective function when the branch corresponding to the widget type is in the traversal path of the selected candidate user interface design.

8. The method of claim 6, wherein the branches of a second node at a second node level of the tree correspond to different page layouts for a panel of the graphical user interface, the page layouts comprising a grid layout and a list-style layout, the method further comprising:
selecting a selected page layout of the different page layouts based on a traversal of a branch of the second node corresponding to the selected page layout.

9. The method of claim 6, wherein the branches of a second node at a second node level of the tree correspond to different separators for a panel of the graphical user interface, the method further comprising:
identify different sub-groups of items to be displayed on the panel of the graphical user interface; and
selecting a selected separator of the different separators for the identified different sub-groups based on a traversal of a branch of the second node corresponding to the selected separator, two or more of the identified different sub-groups being separated from each other based on the selected separator.

10. The method of claim 6, wherein the branches of a second node at a second node level of the tree correspond to predetermined navigation types for the graphical user interface, the method further comprising:
selecting a selected navigation type of the predetermined navigation types for the graphical user interface based on a traversal of a branch of the second node corresponding to the selected navigation type.

11. The method of claim 10, wherein the selected navigation type is selected from a plurality of predetermined top-level navigation types comprising top-level navigation tabs and a top-level navigation carousal.

12. The method of claim 2, wherein the determining and calculating is repeated for a predetermined number of iterations, or until at least one of the plurality of design scores satisfies a threshold design score.

13. The method of claim 2, wherein the design score is calculated based on one or more of a group of predetermined evaluation algorithms comprising:
a first evaluation algorithm that calculates the design score based on an amount of design information within the design specification that was implemented by the respective candidate user interface design; or a second evaluation algorithm that identifies whether the respective candidate user interface design includes default information not in the design specification, and reduces the calculated design score when the default information is identified; or a third evaluation algorithm that calculates the design score based on an amount of screens implemented in the respective candidate user interface design; or a fourth evaluation algorithm that calculates the design score based on a height to width ratio of the screens implemented in the respective candidate user interface design; or a fifth evaluation algorithm that calculates the design score based on unused screen space in the respective candidate user interface design; or a sixth evaluation algorithm that identifies whether the respective candidate user interface design includes horizontal scrolling of one or more screens, and reducing the calculated design score if the horizontal scrolling is identified; or a seventh evaluation algorithm that identifies a task based on the design specification, and a number of user-interactions required to initiate and complete the task, and calculating the design score based on the number of user-interactions; or an eighth evaluation algorithm that determines a count of different decisions made based on a same user-interaction input, and reduces the calculated design score based on the determined count; or a ninth evaluation algorithm that identifies a task based on the design specification, and that identifies a target associated with the task in a screen of the respective candidate user interface design, and determines an estimated amount of time for a user to move to and select the target, and adjusts the design score based on the amount of time.

14. The method of claim 13, wherein the design score is calculated using two or more of the group of predetermined evaluation algorithms, and wherein the design score for the respective candidate user interface design is calculated based on a linear combination of the two or more of the group of predetermined evaluation algorithms.

15. A system, comprising:
one or more processors; and
a memory comprising instructions stored thereon that, when executed by the one or more processors, cause the one or more processors to perform operations comprising:
generating a tree of design actions based on a design specification for generating a graphical user interface, each intermediary node of the tree representing a partial user interface design, and each branch of the tree representing a design action that creates or modifies the partial user interface design;
automatically determining a candidate user interface design that implements the design specification by automatically traversing the tree along a traversal path from a root node of the tree to a leaf node of the tree and executing respective design actions represented by branches along the traversal path;
calculating a design score for the candidate user interface design based on an evaluation of the candidate user interface design;
repeating the determining and calculating to generate a plurality of candidate user interface designs and a corresponding plurality of design scores;
receiving an indication of a selected candidate interface design from the plurality of candidate interface designs based on the plurality of design scores; and
generating the graphical user interface based on the selected candidate user interface design.

16. The system of claim 15, wherein the determining and calculating operations are repeated for a predetermined number of iterations, or until at least one of the plurality of design scores satisfies a threshold design score.

17. The system of claim 15, wherein the operations further comprise:
determining, for a respective intermediary node, an aggregate score that aggregates design scores for candidate user interface designs determined using respective traversal paths that include the respective intermediary node,
wherein, when the tree is traversed, a branch along the traversal path is selected from a plurality of branches based on respective aggregate scores of each node associated with each of the plurality of branches.

18. The system of claim 15, wherein the operations further comprise:
determining an intermediary node for which all branches of the intermediary node have been explored; and
excluding the intermediary node from a future traversal path.

19. The system of claim 15, wherein the design specification is received via a design interface and comprises a hierarchy of groups, each group comprising one or more of a state variable, a command, and textual information.

20. A non-transitory computer-readable medium having instructions stored thereon that, when executed, cause a computing device to perform a method, comprising:
generating a tree of design actions based a design specification for generating a graphical user interface, each intermediary node of the tree representing a partial user interface design, and each branch of the tree representing a design action that creates or modifies the partial user interface design;
determining, automatically without user intervention, a candidate user interface design that implements the design specification by automatically traversing the tree along a traversal path from a root node of the tree to a leaf node of the tree and executing respective design actions represented by branches along the traversal path;
automatically calculating a design score for the candidate user interface design based on an evaluation of the candidate user interface design;
repeating, for a predetermined number of iterations, the determining and calculating steps to generate a plurality of candidate user interface designs and a corresponding plurality of design scores;
identifying a selected candidate interface design of the plurality of candidate interface designs based on the plurality of design scores; and
generating the graphical user interface based on the identified selected candidate user interface design.

\* \* \* \* \*